Dec. 25, 1923.  
J. C. LAW  
HORSESHOE PAD  
Filed June 10, 1922  
1,478,874  
2 Sheets-Sheet 1

Inventor  
James C. Law,

WITNESS:—

Dec. 25, 1923.  
J. C. LAW  
HORSESHOE PAD  
Filed June 10, 1922  
1,478,874  
2 Sheets-Sheet 2
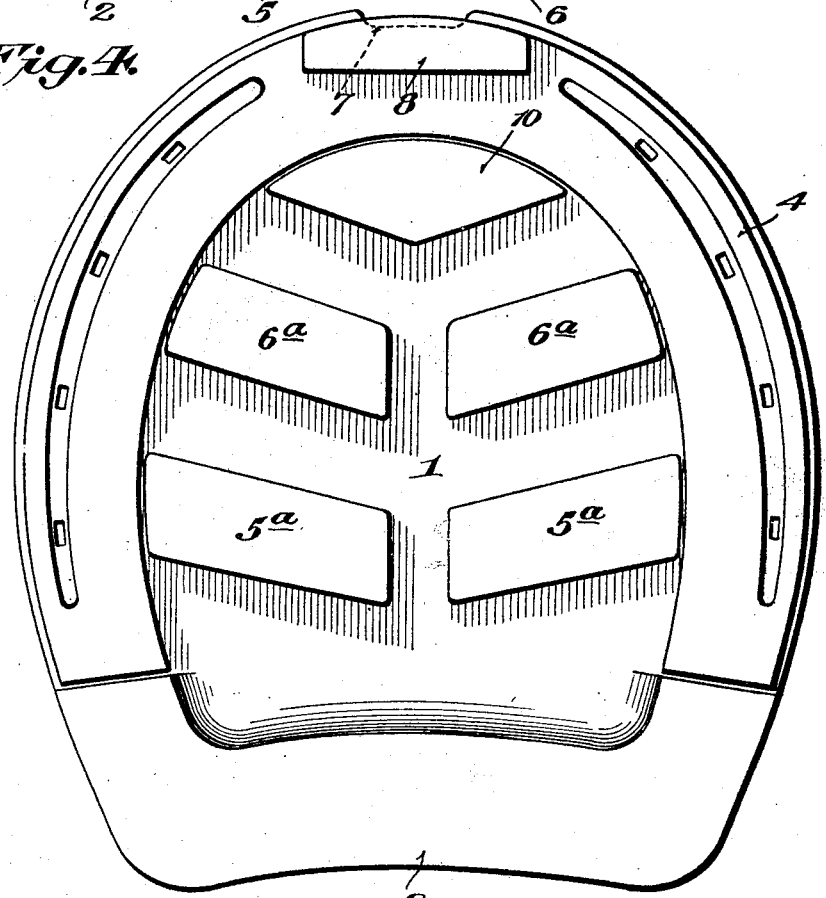

Patented Dec. 25, 1923.

1,478,874

UNITED STATES PATENT OFFICE.

JAMES C. LAW, OF SCRANTON, PENNSYLVANIA.

HORSESHOE PAD.

Application filed June 10, 1922. Serial No. 567,306.

*To all whom it may concern:*

Be it known that I, JAMES C. LAW, residing at Scranton, in the county of Lackawanna and State of Pennsylvania, have invented new and useful Improvements in Horseshoe Pads, of which the following is a specification.

This invention relates to horseshoe pads, and has for one of its objects to provide a new and improved pad capable of being conveniently applied to an ordinary horseshoe or tip, and which is also provided with an improved and efficient non-skid surface for contact with the roadway so as to prevent slipping on icy and wet pavements.

A further and important advantage of the invention resides in the fact that the pad is so constructed as to permit of the pad being conveniently trimmed so as to fit a horseshoe or tip after the latter has been shaped or fitted to a horse's hoof. This very important advantage is brought about by the fact that the pad is so constructed that it may be conveniently trimmed along its side edges so as to fit a shoe after the latter has been shaped to a horse's hoof. The present invention obtains a maximum tractive and non-skid contact with the roadway, and at the same time provides a broad, elastically yieldable bearing for the horse's hoof which operates to prevent pave soreness, contracted feet, and tendon strains.

With these and other objects in view, the present invention consists in the combination and arrangement of parts as will be hereinafter more fully described, shown in the accompanying drawings, and pointed out in the appended claims, it of course being understood that changes in the form, proportion, size, and minor details, may be made within the scope of the claims, without departing from the spirit or sacrificing any of the advantages of the invention.

In the drawings:—

Fig. 3 is a sectional view taken on the line 3—3 of Fig. 1;

Fig. 4 is a view similar to Fig. 1, showing a modification of the invention; and Fig. 5 is an end elevation showing the inclination of the tractive surface of the pad.

Figure 1:
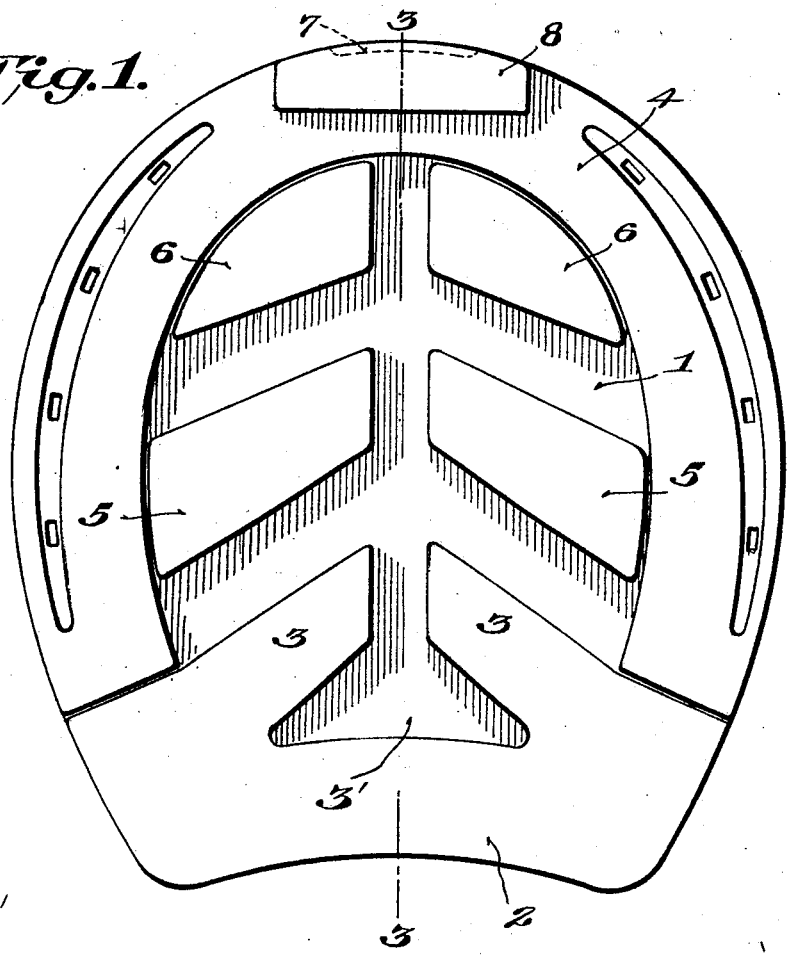
Figure 1 is a bottom plan view of a conventional form of horseshoe associated with a pad embodying the features of the present invention.
Figure 2:
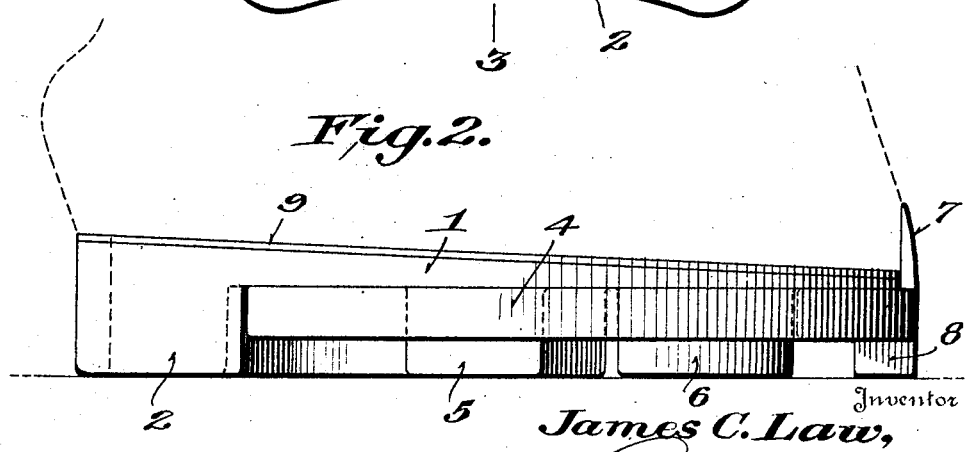
Fig. 2 is a side elevation of a horseshoe pad of the present invention associated with a horseshoe in the normal condition of the device.

Referring at first more particularly to Figs. 1, 2, and 3 of the drawings, it will be seen that the present invention includes a base or body 1, which is preferably of elastically yieldable rubber having the general configurations of a horse's hoof. Extending transversely across the rear end of the pad is a depending heel 2 which may be integral with the pad or otherwise secured rigidly thereto. Associated with the heel are heel extensions 3 which converge toward the longitudinal axis of the pad with their inner ends separated by a space of suitable width. Preferably, the portions 2 and 3 are integral, and define a substantially triangular space 3' between said parts. The heel 2, as best shown in Fig. 2, has the general appearance of the heel portion of a shoe for human beings, and is braced and strengthened by the extensions 3 so as to prevent breaking or cracking of the heel transversely in rear of the metal shoe, which shoe is designated 4.

Disposed in substantial parallelism with each of the heel extensions 3 are non-skid projections 5 and 6. As in the case of the parts 3, the pairs of non-skid projections 5 and 6 have their inner ends spaced. The outer ends of the projections 5 and the outer edges of the projections 6 are struck on an arc corresponding generally to the inner contour of the metal shoe 4, so as to have a reasonably close fit within the shoe. By this arrangement, the body 1 of the pad has a peripheral portion extending around the non-skid projections and constituting a flange against the under side of which the metal shoe rests. The shoe is secured in place in the usual manner by horseshoe nails, which also pass through the flange portion of the pad, whereby the pad is secured to the hoof merely by applying the shoe to the pad and then nailing the shoe to the hoof.

The shoe is provided at its front end with the usual upstanding clip 7 and depending toe calk 8, which latter may be of any preferred size and configuration. The calk may be integral with the shoe, or an attached calk, as may be desired.

By reference to Fig. 2, wherein a hoof has been partially indicated in dotted lines, it will be seen that the metal horseshoe 4 does not contact with the roadway, except at the toe calk 8, and that it is the heel 2 and the non-skid projections which constitute the tread of the device and which contact with the roadway.

In applying the pad and the horseshoe, the latter is first shaped to the hoof, the sides of the shoe being drawn together, if necessary, to properly fit a contracted hoof. If the interior contour of the shoe has been changed by fitting so that the non-skid projections will not fit within the inner periphery of the shoe, then the outer ends of the projections 5 and 6 may be cut or trimmed until they fit properly within the metal shoe, and then the metal shoe may be placed flat against the flanged portion of the pad and the combined device then nailed to the hoof in the usual manner.

If desired, the upper surface of the pad may be provided with a fabric or leather facing 9, secured to the rubber body 1 in any suitable manner.

While the top surface of the body of the pad has been shown dished, in Fig. 3, and while this is important, the top surface of the pad may be flat, if desired.

By reason of the fact that the metal horseshoe terminates at its rear end at the front of the heel 2, it will be understood that the heel portion of the pad is not secured snugly to the bottom of the hoof, and therefore the slight working action between the heel of the pad and the heel of the hoof will operate in the manner of a pump to eject fetid air which may collect between the pad and the bottom of the hoof.

An important feature of the device resides in the spaced relation of the non-skid projections 3, 5, and 6, whereby clearance passages are provided so as to prevent the accumulation of snow, ice, mud, and the like, between said projections.

The purpose of providing a space between the inner ends of the projections and at the longitudinal center of the pad is to provide for flexure of the pad so as to add to the yielding effect due to the inherently elasticity of the non-skid projections and the heel.

A modified form of the invention has been shown in Fig. 4, wherein it will be seen that the heel extensions have been omitted, and the non-skid projections 5ª and 6ª are inclined inwardly and rearwardly, but are otherwise spaced in accordance with the form shown in Fig. 1 of the drawings. Moreover, the modified form has a single non-skid projection 10, located at the toe end of the pad, but of course within the inner periphery of the horseshoe. Otherwise, the pad shown in Fig. 4 is the same as that shown in Fig. 1.

In each form of the pad, and as best shown in Fig. 5 of the drawings, it will be seen, as indicated at 11, that the under or tread surfaces of the non-skid projections incline downwardly and inwardly towards the longitudinal center of the pad, so as to add to the tractive effect of the pad.

By my peculiar arrangement of non-skid projections, I obtain the maximum tread area on a given size of pad, and at the same time present such a configuration of rubber tread or projections as to prevent a horse from slipping or skidding on wet or icy pavements.

In my construction, the plane of the entire tread is below the plane or lower face of the iron shoe or tip, so that the iron does not come in direct contact with the pavement, and consequently the horse is relieved of the shocks of direct contact of an all iron shoe until the non-skid projections are worn down to the plane or face or the iron shoe, under which condition the pad is considered to be worn out, and should then be replaced. Inasmuch as the iron does not contact with the pave, the metal shoe may be repeatedly used, as the only wear comes upon the metal toe calk, which may be reshaped or replaced when desired.

What I claim is:

1. A horseshoe pad comprising a body provided on its under side with a depending heel portion terminating at opposite ends in integral extensions converging towards the toe end of the pad, and mutually independent non-skid projections depending from the pad and disposed substantially parallel with the respective heel extensions and having their inner ends spaced at the longitudinal center of the pad, the inner ends of said projections and heel extensions defining a central longitudinal clearance channel, the side walls of the projections and extensions defining open-ended clearance channels extending obliquely of the pad, the outer ends of the projections terminating short of the outer periphery of the pad, the marginal portion of the pad outside of the projections constituting a seat for a horseshoe, the width of said seat being substantially equal to that of the size of the shoe for which the pad is intended.

2. A horseshoe pad comprising a body provided on its under side with a depending heel portion, mutually independent non-skid projections depending from the pad and disposed at opposite sides of the longitudinal center of the pad, the projections at one side of the pad being substantially parallel and disposed obliquely of the pad, the inner ends of corresponding projections defining a longitudinal clearance channel, the side walls of the projections defining open-ended obliquely-disposed clearance channels, the marginal portion of the pad outside of the projections constituting a seat for a horseshoe, the width of the seat being substantially equal to that of the size of shoe for which the pad is intended.

3. The combination of a horseshoe and a pad therefor, said pad comprising a body lying against the upper side of the shoe and provided with mutually independent non-skid projections lying within the space bounded by the horseshoe, the outer sides of the projections lying adjacent the inner periphery of the shoe and normally accessible for trimming to fit within the shoe, said projections being spaced to define a longitudinal clearance channel and oblique open-ended clearance channels.

JAMES C. LAW.